No. 613,774. Patented Nov. 8, 1898.
G. H. NOBBS.
TIRE INFLATER.
(Application filed Aug. 3, 1897.)
(No Model.)
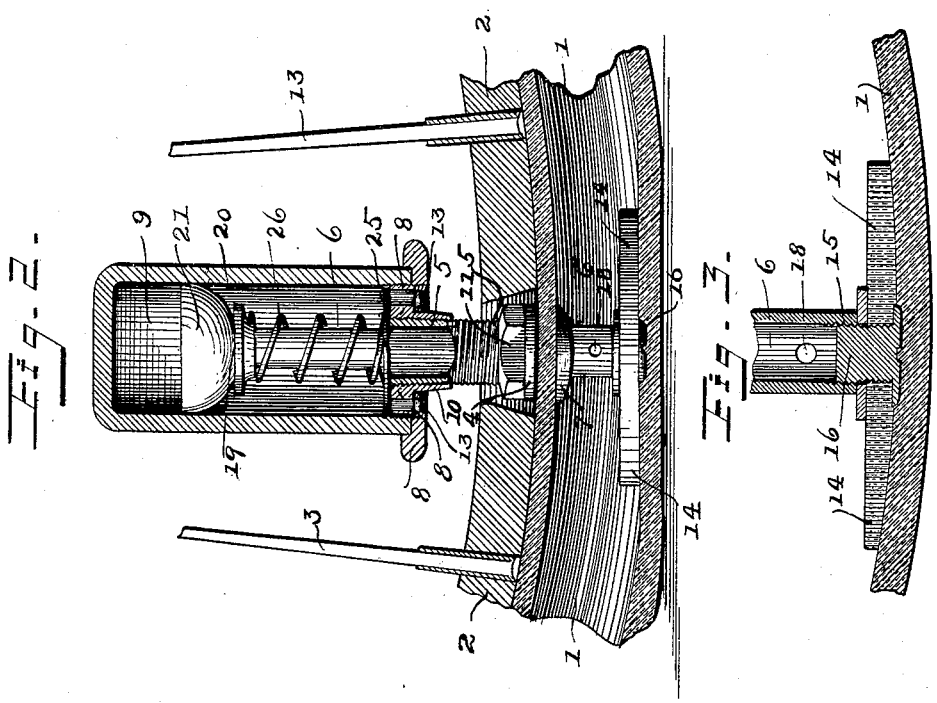
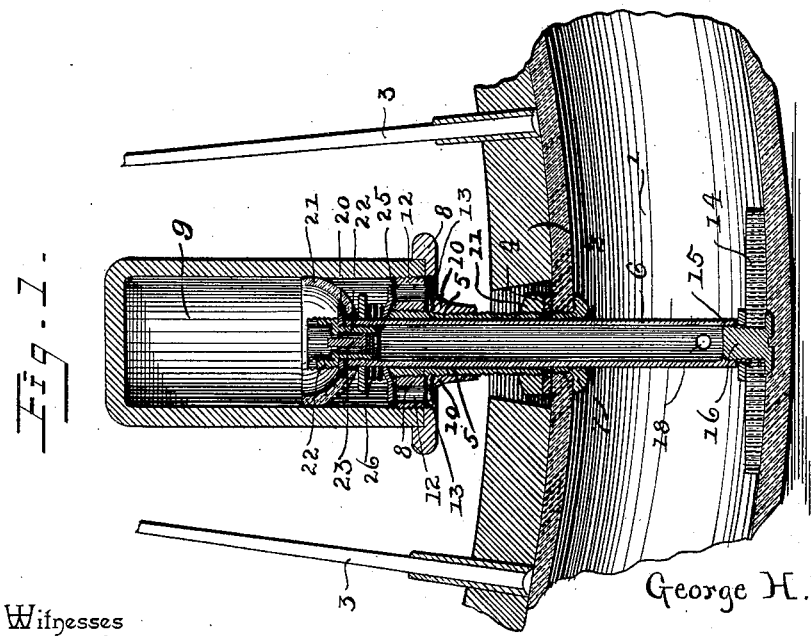
Witnesses
C. J. Young
H. F. Benkord
Inventor
George H. Nobbs,
By his Attorneys,
C. A. Snow & Co.
THE NORRIS PETERS CO., PHOTO-LITHO., WASHINGTON, D. C.

UNITED STATES PATENT OFFICE.

GEORGE H. NOBBS, OF JAMAICA, VERMONT.

TIRE-INFLATER.

SPECIFICATION forming part of Letters Patent No. 613,774, dated November 8, 1898.

Application filed August 3, 1897. Serial No. 646,991. (No model.)

*To all whom it may concern:*

Be it known that I, GEORGE H. NOBBS, a citizen of the United States, residing at Jamaica, in the county of Windham and State of Vermont, have invented a new and useful Tire-Inflater, of which the following is a specification.

My invention relates to improvements in tire-inflating pumps of that class in which the device is applied to a vehicle-wheel to remain a permanent fixture thereon, so as to serve automatically to force air into the tire to keep the pressure up to the required point and maintain the desired hardness of the tire.

The primary object of the present invention is to provide an improved tire-inflating pump in which the pressure-spring, commonly used to return the hollow position to an extended position to bear against the inner surface of the tread portion of the tire, is wholly dispensed with.

A further object of the invention is to provide the improved inflating mechanism with a simple form of valve arranged and combined to serve the twofold purpose of an inlet-valve and a safety-valve, which latter office is highly desirable, because the valve prevents the tire from being inflated too hard.

A further object of the invention is to provide an improved inflating mechanism of simple and inexpensive construction which may be applied readily to ordinary makes of wheel rims and tires, which shall be efficient and reliable in service, cheap of manufacture, and serve to exclude to a great extent dust from entering the working parts of the device to interfere with the proper operation of said device.

With these ends in view my invention consists in the novel combination of devices and in the construction and arrangement of parts which will be hereinafter fully described and claimed.

To enable others to understand my invention, I have illustrated the preferred embodiment of the same in the accompanying drawings, forming a part of this specification, and in which—

Figure 1 is an enlarged sectional view through an inflating-pump constructed in accordance with my invention and shown applied to a wheel-rim and inflatable tire. Fig. 2 is a view similar to Fig. 1, illustrating the piston and its hollow rod forced inward by pressure against the tread-surface of the tire. Fig. 3 is an enlarged detail view of the connector between the hollow piston-rod and the tread portion of the tire.

Like numerals of reference denote corresponding parts in all the figures of the drawings, referring to which—

1 designates a portion of an ordinary inflatable tire, 2 is a section of the wheel-rim, and 3 are the spokes of an ordinary wheel, all these parts being of the usual construction of bicycle-wheels, for which no novelty is claimed in this application.

My improved inflating device is designed to be applied to or installed on ordinary wheels with inflatable tires in a manner to be operated automatically as the wheel rotates, and said inflating device forms a fixture or permanent part of such a wheel. The inflating device is of compact construction, so as not to interfere with the wheel in any way, and it is light in weight to avoid adding to the weight of the wheel materially.

At a suitable point in the inner part of the tire and in the rim is formed a transverse opening 4, through which is passed the sleeve or bushing 5. This bushing is bored true to receive and fit tightly upon the reciprocating hollow piston-rod 6 of the pump. Said bushing or sleeve is provided at its inner end with an enlarged head or flange 7, which is fitted against the inner part of the tire 1 and secured in place in any suitable way therein, so as to form a tight joint with the tire in a manner to prevent leakage of air at the point where the bushing is united to the tire. The bushing is exteriorly screw-threaded for a part of its length to enable the detachable inner head 8 of the pump-cylinder 9 to be fastened to the fixed bushing or sleeve 5. Said detachable head 8 of the cylinder is provided with a nipple 10, threaded to screw upon the protruding end of the bushing or sleeve, and against the tire is fitted a washer 11ª, on which bears the jam-nut 11, which is fitted on the externally-threaded stem or shank of the bushing or sleeve 5.

The cylinder is wrought or made from a single piece of metal, and it is imperforate throughout to effectually exclude dust, &c.

The outer end of the cylinder—i. e., that end remote from the wheel-rim—is closed and integral with the cylinder-shell; but the end of the cylinder adjacent to the wheel-rim is open and threaded to provide for the attachment of the head 8 to said open end of the shell of the cylinder. The head 8 thus serves as a means for attaching the cylinder rigidly to the bushing or sleeve 5, and the latter operates to hold the cylinder in a stationary position with relation to the wheel-rim and the inflatable tire.

The head 8 of the cylinder is provided at diametrically opposite points with the transverse air-inlet ports 12 12, by which air is admitted to the interior of the cylinder. Dust and dirt are prevented to a large extent from entering the pump through the ports 12 by means of the perforated dust-cap 13, which is attached centrally to a shoulder or enlarged part of the bushing or sleeve 5. This dust-cap is a disk or plate of wire-gauze or perforated metal, and it is shaped to enable it to fit snugly over the head 8, so as to protect the inlet-ports 12 in said head of the cylinder.

The hollow piston-rod 6 of my pump is not designed to be forced outwardly to bear against the tread of the tire by a pressure-spring, as is common in prior devices of this class; but the outer extremity of said hollow piston-rod is positively and flexibly connected to the inner face of the tread portion of the tire by a flexible connector 14, whereby the piston is controlled or actuated positively and mechanically by the movement of the tread-surface of the tire as pressure is exerted thereon by the tread coming in contact with the surface of the ground. In the preferred embodiment of this part of my invention the outer end of the hollow piston-rod is provided with an internally-threaded socket 15 to receive the shank of a screw 16, which is united to the flexible connector 14, preferably by vulcanizing the screw thereto. This flexible connector is a disk of elastic rubber or other suitable material, and the screw 16 is united centrally thereto to have the head of the screw on that surface of the connector-disk next to the inner face of the tire, to which the connector is united by cementing it in place or uniting it thereto in any other preferable way. The shank of the screw protrudes through the flexible connector to enable the socketed end of the hollow piston-rod to be coupled to the screw by rotating the piston-rod thereon after the connector has been applied. This construction enables the connector to be readily applied to the inner surface of a tire and provides for the ready attachment and detachment of the piston-rod after the flexible connector has been secured in place. The hollow piston-rod is provided near its inner end with the transverse ports 18 to discharge air into the chamber of the tire 1, and said piston-rod passes through the sleeve or bushing 5 to have close frictional engagement therewith, but to move or play freely therein.

Within the cylinder 9 of the pump is arranged a piston-head 19, and this piston-head consists of a metallic disk 20 and a flexible disk 21. The metallic disk 20 of the piston-head is of less diameter than the cylinder 9 and the flexible disk 21, and said rigid metallic disk 20 is secured or attached in any suitable way to the inner end of the hollow piston-rod. The flexible disk 21 of the piston-head is of such diameter that its edges will turn laterally by contact with the walls of the pump-cylinder, and said flexible disk is loosely confined at its center by means of a hollow valved coupling-stem 22, which is fastened to the inner extremity of the hollow piston-rod. This coupling-stem 22 is of tubular or cylindrical form, with a threaded inner end to be screwed into a correspondingly-threaded part of the piston-rod, and said coupling-stem is arranged in alinement with the piston-rod, so as to have its open end communicate with the air space or chamber of the pump-cylinder. This inner open end of the coupling-stem is enlarged as compared with that part thereof which is attached to the piston-rod, and through the flexible disk 21 of the piston-head is made an opening the diameter of which is greater than that of the coupling-stem within the enlarged extremity thereof; but the diameter of this enlarged extremity of the coupling-stem is greater than the diameter of the hole in the disk 21. The coupling-stem thus serves to loosely confine the flexible disk in place against the rigid disk of the piston-head, and said flexible loosely-confined disk is free to have a limited movement on the instroke of the piston-rod to permit the air admitted by the ports 12 to pass the flexible disk of the piston-head. This hollow coupling-stem 22 carries a check-valve 23 interiorly within the same, and this check-valve is arranged to be seated within the coupling-stem and to open in one direction to permit air to pass from the pump-cylinder to the piston-rod; but said valve arrests the back pressure of air from the tire toward the pump-cylinder.

Inside of the pump-cylinder is arranged an automatic valve 25, which lies over the air-ports 12 in the head 8 of the pump-cylinder, and this valve is constructed and arranged to serve the purposes of an air-inlet valve and a pressure-valve. The valve 25 is a metallic disk turned to accurately fit the piston-rod and to lie close against the inner face of the head 8 of the pump-cylinder, and this valve is normally pressed upon the cylinder-head 8 by a weak coiled spring 26, which is arranged around the piston-rod to have one end of the spring seated against the disk 20 of the piston-head and the other end of the spring bearing against the valve 25. The spring 26 is of such weak tension that it permits the opening of the valve and the ports 12 when the piston-head moves away from the cylinder-head; but when the piston moves toward the cylinder-head the spring compresses and forces the valve 25 tightly upon its seat formed by the cylinder-head 8, thus securely closing the ports 12 in the cylinder-head.

This being the construction of my automatic inflating-pump the operation may be described briefly as follows: With the tire entirely deflated the operator pinches the tire between the thumb and forefinger directly over the flexible connector 14, which unites the piston-rod to the tire, and the tire is manipulated to reciprocate the piston-rod and the piston for a short time, thus operating the pump by hand to force air into the tire until the resistance of the air-pressure is sufficient to return the piston when the pressure of the hand is removed from the tire. The operator now presses on the tire opposite to the piston-rod to force the latter inward, and the air-pressure of the tire distends the latter and moves the piston outward, this operation being continued until the air-pressure in the tire makes the tire so difficult of operation that the pump cannot be worked advantageously. At this time it will be found that the tire is sufficiently inflated to sustain the load which may be placed on the wheel, and thereafter when the wheel is in motion the pump is operated automatically to force air into the tire to keep the same under proper pressure. As the wheel rotates upon the ground the pressure of the tire upon the piston moves the latter inward when the piston reaches a point opposite to the ground; but as soon as the piston-rod passes this point the pressure on the tire is removed, and the piston is moved outward by the distention of the tire due to the pressure of the air therein. The flexible disk 20 of the piston-head is forced tightly upon the metallic disk when the piston moves in a direction to compress the air in the pump-cylinder, and at this time the tension of the spring 26 is weakened by the movement of the piston to allow the external air-pressure to open the valve 25 and admit air to the cylinder through the ports 12. On the stroke of the piston in the reverse direction the spring presses the valve 25 tightly upon its seat, and the disk 21 yields or gives to permit the air to pass by the disk and enter the compression-chamber of the pump-cylinder.

My improved pump is automatic in operation under normal conditions, and the piston-rod is mechanically and positively moved by connection with the inflatable tire, thus wholly dispensing with the employment of a spring to effect the movement of the piston-rod and the piston in one direction. A tire which is not inflated enough to withdraw the piston from the pump-cylinder is not sufficiently hard to prevent the wheel-rim from striking the ground, and consequently the wheel is not suitable for riding. Hence the necessity for operating the pump by hand until the tire has been inflated sufficiently to sustain the weight of the wheel and its rider. The automatic valve 25 serves as an inlet-valve to close the ports 12 when the piston-head moves in one direction, and this valve also serves as a safety-valve, in that it prevents the admission of air to the pump-cylinder when the air-pressure in the tire maintains the latter in such hard and inflexible condition that the piston-rod will not have any appreciable movement in the pump-cylinder.

My automatic inflating mechanism may be readily applied to any ordinary tires, either single or double tube tires, and the parts are all accessible and detachable to enable them to be repaired or inspected with ease and facility.

I am aware that changes in the form and proportion of parts and in the details of construction may be made without departing from the spirit or sacrificing the advantages of my invention. I therefore reserve the right to make such modifications and alterations as fairly fall within the scope of my invention.

Within the pump-cylinder are arranged the angular lugs or arms which are attached to the head 8 and bent to lie in the path of the valve 25. These lugs serve to limit the play of the valve with relation to the disk or head 8, which serves as the seat for the valve.

The opening 4 in the wheel-rim tapers from its inner wide end to the surface of the rim, and in said hole 4 is arranged the washer 11$^a$ and the jam-nut 11. The nut is fitted on the threaded stem or bushing 5 to operate in conjunction with the head 7 and clamp the tire firmly and solidly to the bushing of the pump 6, making an air-tight connection between the pump and the tire. By having the hole 4 in the rim slightly larger than the bushing 5 and arranging the binding-nut 11 as described a limited lateral motion is allowed to the bushing, which is desirable should the tire suddenly strike a stone or rut which would serve to change the center of contact. This construction allows for unevenness of the ground and obviates binding of the piston in the bushing. Another advantage is that the cylinder and pump mechanism are brought in close relation to the inner surface of the rim, thus shortening the bushing 5.

The inner end of the valve coupling-stem 22 is threaded on its inner and outer surfaces to provide two sizes of connections to which ordinary pumps may be attached when the cylinder 9 is disconnected, whereby a foot or hand pump may be readily attached to the part 22 for inflating the tire.

In the operation of my invention should the tire sustain a puncture and air escape through the same the pump increases its stroke and replaces the air which escapes through the puncture, thus under all ordinary conditions keeping the tire inflated until the wheelman reaches a place where the puncture can be repaired conveniently.

In my construction the hole 4 in the rim is not enlarged to the extent necessary for prior devices, the holes in which tend to weaken the rim. According to my invention it is only necessary to provide a hole of sufficient diameter to receive a common valve-stem.

Having thus fully described my invention, what I claim as new, and desire to secure by Letters Patent, is—

1. The combination with a tire, of a bushing or sleeve attached thereto, a pump-cylinder mounted on said sleeve, a hollow piston-rod passing through the sleeve into the tire and coupled to the tread-surface of the tire on the interior thereof, a two-part piston-head fitted to the inner end of the piston-rod, and a hollow coupling-stem fastened to the inner end of the piston-rod and clamping the piston-head thereto, said coupling-stem opening into the cylinder and provided with an interior valve which checks the back pressure of air from the piston-rod and the tire, substantially as and for the purposes described.

2. The combination with a bushing or sleeve fixed to a tire, of a cylinder attached to said bushing or sleeve, the air-inlet ports in the head at the outer end of said cylinder, the flat inlet-valve loosely fitted in the cylinder to cover the inlet-ports thereto, a reciprocating piston-rod having a piston-head playing in said cylinder, and a coiled spring seated at one end against the piston-head and at its other end against the inlet-valve to permit the latter to open on the inward stroke of the piston head and rod, substantially as described.

3. In an automatic tire-inflating pump, the combination with a bushing or sleeve, and a cylinder fitted removably thereto, of a tubular piston-rod, a piston-head attached thereto, a coupling-stem attached to the open outer end of the tubular piston-rod and having a threaded nipple which projects beyond the piston-head for the attachment of a pump connection when the cylinder is removed, and an inwardly-opening check-valve within the coupling-stem, substantially as described.

In testimony that I claim the foregoing as my own I have hereto affixed my signature in the presence of two witnesses.

GEORGE H. NOBBS.

Witnesses:
CHAS. B. DOANE,
JAMES NOBBS.